(No Model.) 3 Sheets—Sheet 1.
H. C. J. GEHRKE.
BEER FILTER.
No. 477,208. Patented June 21, 1892.
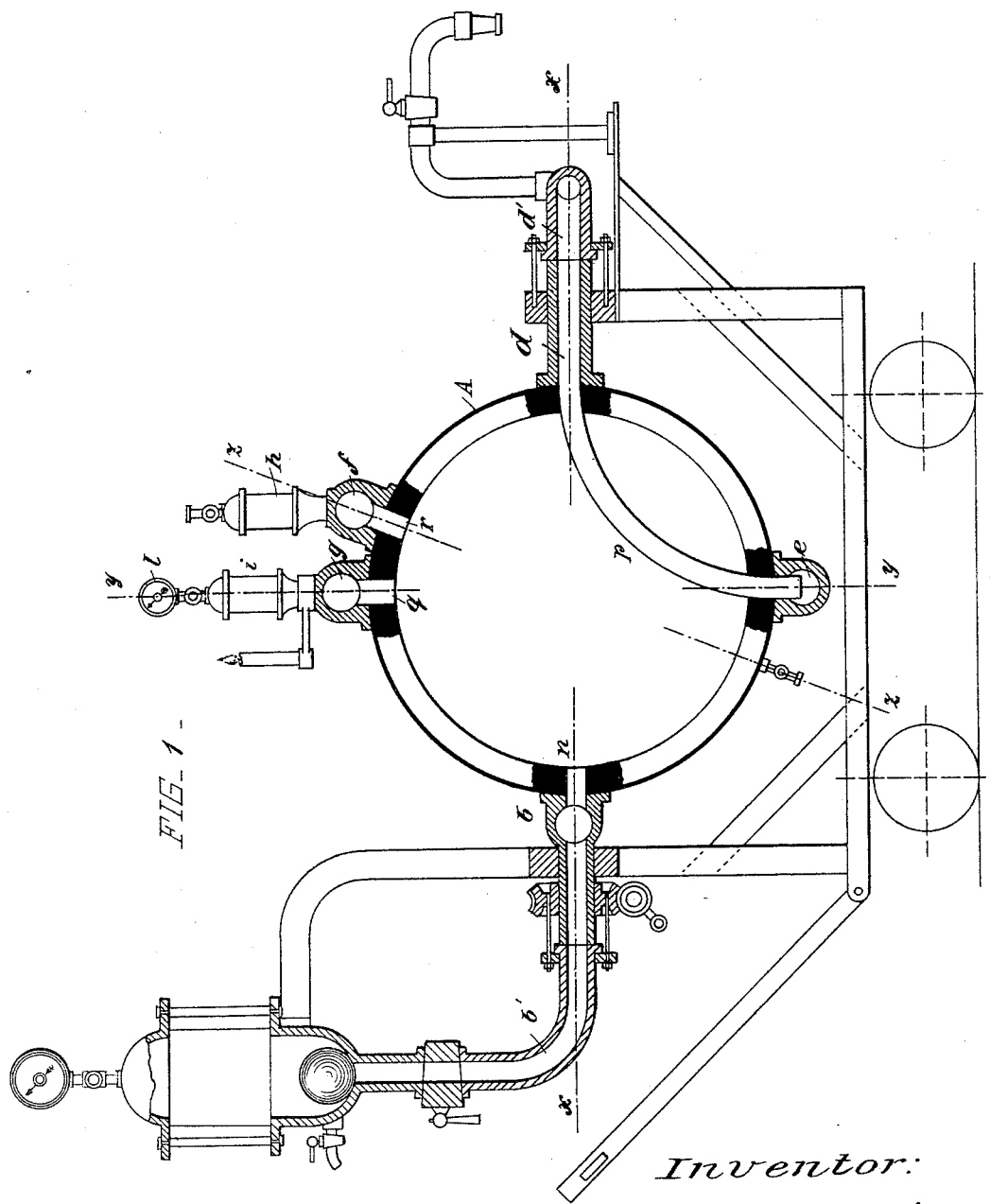
Witnesses.
E. B. Kolton
H. Kuterer
Inventor:
Heinrich Carl Johann Gehrke
By Richards
his Attorneys.

(No Model.)  H. C. J. GEHRKE.  3 Sheets—Sheet 2.
BEER FILTER.

No. 477,208.  Patented June 21, 1892.

Witnesses.
E. B. Bolton
H. Kusterer.

Inventor:
Heinrich Carl Johann Gehrke
By Richards
his Attorneys.

THE NORRIS PETERS CO., PHOTO-LITHO., WASHINGTON, D. C.

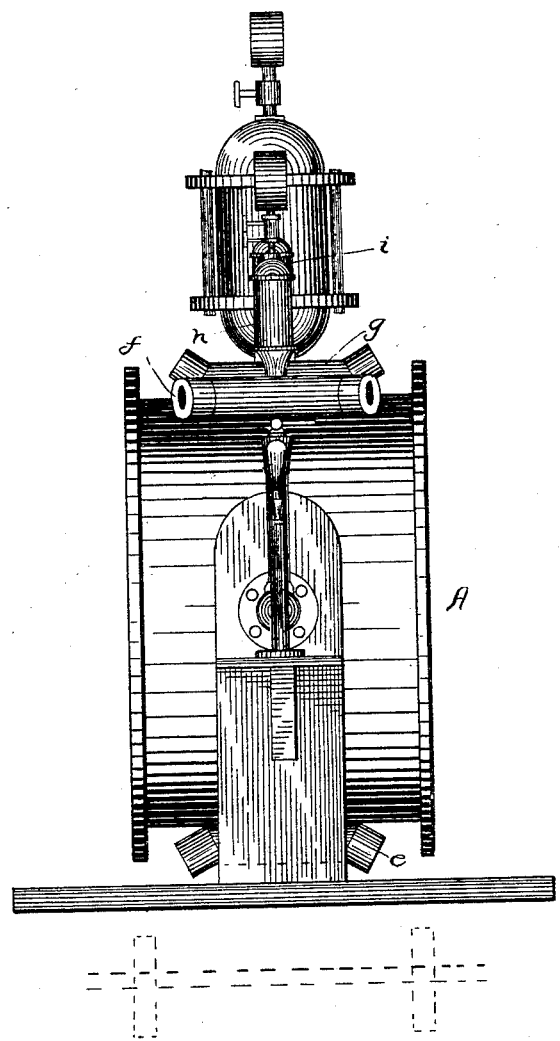

UNITED STATES PATENT OFFICE.

HEINRICH CARL JOHANN GEHRKE, OF BERLIN, GERMANY.

BEER-FILTER.

SPECIFICATION forming part of Letters Patent No. 477,208, dated June 21, 1892.

Application filed July 3, 1891. Serial No. 398,390. (No model.)

*To all whom it may concern:*

Be it known that I, HEINRICH CARL JOHANN GEHRKE, a subject of the King of Prussia, residing at Berlin, have invented certain new and useful Improvements in Beer-Filters, of which the following is a full, clear, and exact description.

The improvements in beer-filtering apparatus forming the subject of the present invention have not only in view the formation of comparatively large filtering-surfaces within a limited space and the turning of the apparatus without loosening any hose or turn-tube connection, but also principally that the filtered beer may be drawn off from a special chamber or basin arranged underneath the apparatus and not inclosed by filtering-layers at the place where the beer first comes to rest, and thus avoiding the formation of foam and escape of gas during the transfer of the beer drawn from the stock-barrels to the transport-vessels.

On the accompanying drawings the new beer-filtering apparatus is shown.

Figure 3:
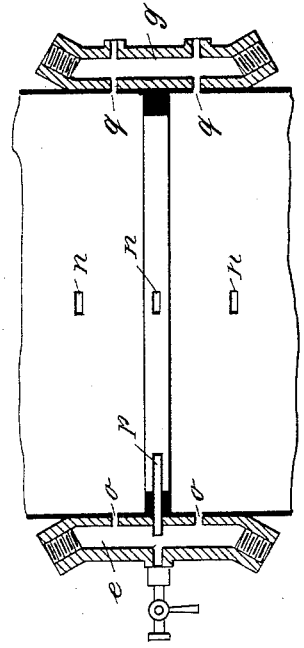
Figure 5:
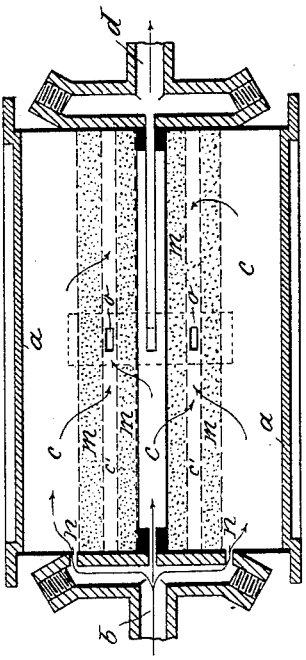
Figure 2:
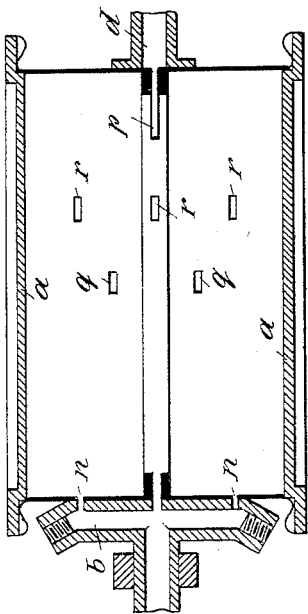
Figure 4:
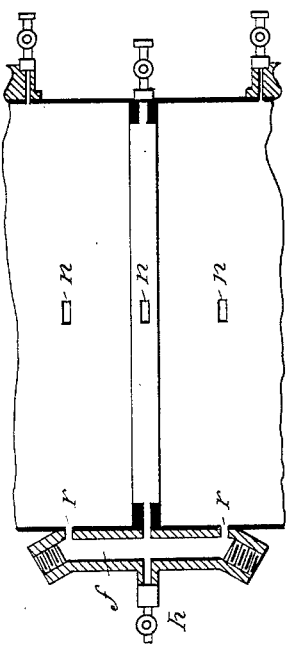

Figure 1 is a vertical section. Fig. 2 is a section following line $x$ $x$. Fig. 3 is a section following line $y$ $y$, and Fig. 4 is a section following line $z$ $z$ of Fig. 1. Fig. 5 shows the filtering apparatus in a horizontal section with inlaid filtering-layers. Fig. 6 is an elevation of the apparatus from the outlet side.

The new filtering apparatus consists of a disk-like cylindrical-shaped body A, whose open sides are closed by covers $a$ $a$. The cylinder-casing A is provided on its outer side with different fittings, of which $b$ admits the unfiltered beer into the filtering-chambers $c$ $c$ $c$, and $d$ is the let-out of the filtered beer from the filtering-chambers $c'$ $c'$ by using the tank $e$, arranged on the outer side of the apparatus, while the fittings $f$ and $g$ make the connections of the gaging-glasses $h$ and $i$ for the unfiltered and for the filtered beer; and it also consists of the manometer $l$ in the interior of the apparatus. In the interior of the cylinder-casing X filtering-plates on $m$ $m$ are so arranged that the chambers $c$ $c$ $c$ are formed for the unfiltered beer and the chambers $c'$ $c'$ for the filtered beer, and the positions of the chambers to one another are such that a chamber $c'$ is always between two chambers $c$ $c$, separated from them by filtering-plates. The fitting $b$ is provided with canals $n$, which lead into the chambers $c$ $c$ $c$, destined for the occupation of the unfiltered beer. The tank $e$, arranged at the lowest point outside the filtering apparatus, is in connection through canals $o$ $o$ with the chambers $c'$ $c'$ for the filtered liquid, which first comes to rest here. For the connection of the draw-off socket $d$ with the tank $e$ the tube $p$ is used, which goes through the middle filtering-chamber $c$. The fittings $b$ and $d$ are so made that they at the same time serve as the turning-axles of the apparatus A. For connection with the gaging-glass $h$ for the unfiltered beer the fitting $f$ and the canals $r$ $r$ are used. For that of the gaging-glass $i$ for the filtered beer the fitting $g$ and the canals $q$ $q$ serve.

The manner in which the filtering apparatus works is as follows: The beer coming through socket $b$ from the stove-vat flows through canals $n$ $n$ $n$ into the filtering-chambers $c$ $c$ $c$ and goes pressed through the filtering-plates $m$ $m$ $m$ $m$ into the filter-chambers $c'$ $c'$, from which it goes through canals $o$ $o$ into the draw-off canal or chamber $e$. In this place the beer comes to rest first and is led from here by means of tube $p$, which runs through the middle filter-chamber $c$ into the transportation-barrels. Thereby the transferring of the liquid to the draw-off socket $d$ is done in the interior of the apparatus, and the feed and discharge sockets $b$ $d$ are connected with the feed and discharge tubes $b'$ $d'$ by means of stuffing-boxes. The apparatus can be turned for the purpose of changing the filtering substances without loosening any tube or pipe connection. In consequence of the arrangement of the peculiar fittings $b$, $d$, and $e$ on the outside of the apparatus large filtering-surfaces are furthermore obtained within a limited space. Thereby the chambers $c'$ $c'$ for the filtered liquid can be separated from the chambers $c$ $c$ $c$ for the unfiltered beer on both sides by means of the filtering-bodies $m$ $m$ $m$ $m$. It is understood that the arrangement of the filtering-chambers can also be used in reverted succession. As the filtered beer, as well as the unfiltered beer, is under the same pressure in this apparatus as exists in the stove-vat, and as, furthermore, filtered beer is drawn off at the point where it first comes to rest, every harmful escape of gas and formation of foam are avoided when filtering or drawing off.

I claim—

The herein-described improved apparatus, consisting of the cylindrical body provided on its outside with an inlet $b$ for unfiltered material, a draw-off socket for filtered material, and gage-glasses, and manometer, filtering-plates $m\ m$, so arranged as to form chambers for unfiltered material and for filtered material, canals leading from inlet $b$ to the chambers for unfiltered material, a tank on the outer lower side of the apparatus, a tube connected with the draw-off socket and passed through the middle filtering-chamber, and canals connecting the chambers for filtered material with the outer tank, substantially as set forth.

In witness whereof I have hereunto set my hand in presence of two witnesses.

HEINRICH CARL JOHANN GEHRKE.

Witnesses:
CHR. FRISCH,
H. KUSTERER.